June 1, 1926. 1,586,835
P. PALMGREEN
VALVE SPRING LIFTER
Filed Oct. 10, 1925
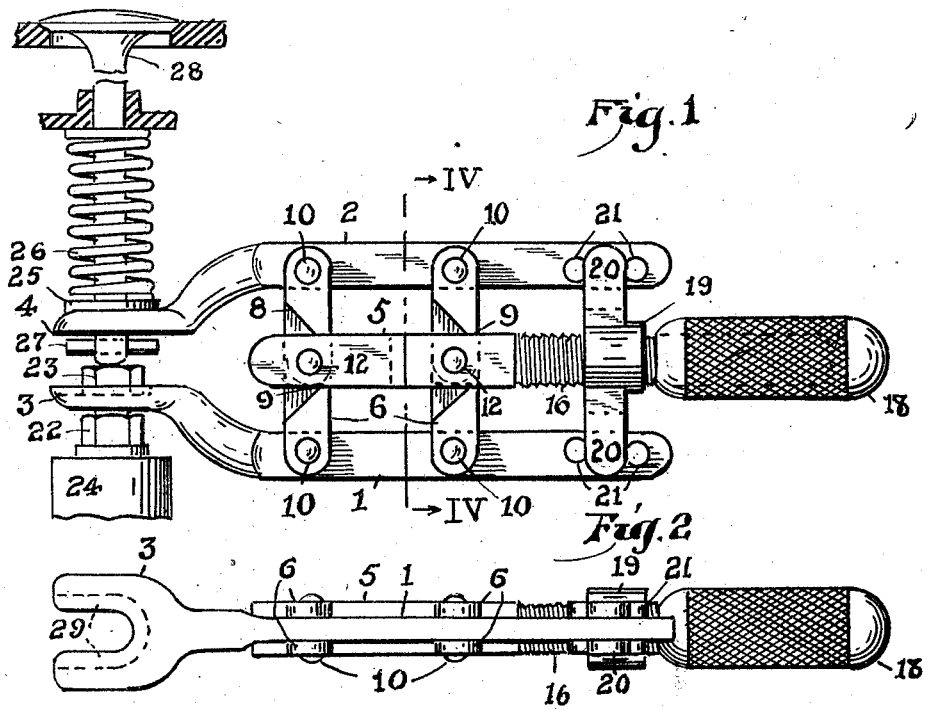
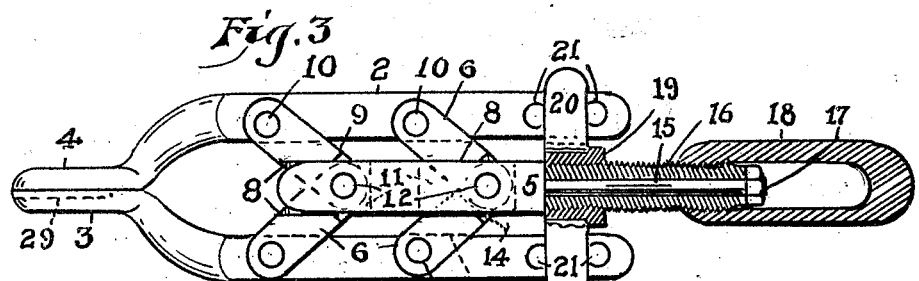
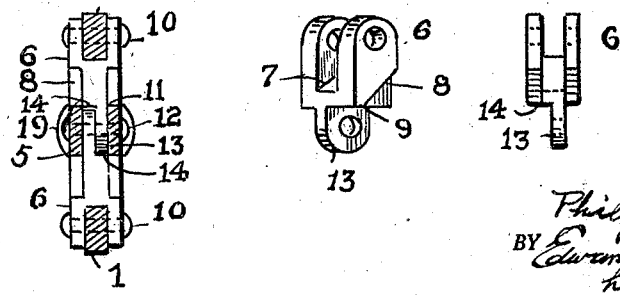
INVENTOR.
Philip Palmgreen,
BY Edward A. Lawrence
his ATTORNEY.

Patented June 1, 1926.

1,586,835

UNITED STATES PATENT OFFICE.

PHILIP PALMGREEN, OF McKEESPORT, PENNSYLVANIA.

VALVE-SPRING LIFTER.

Application filed October 10, 1925. Serial No. 61,710.

My invention relates to tools employed in lifting and compressing the springs of the valves of internal combustion engines and the like, so that the spring abutment pin may be removed from the valve stem, thus loosening and permitting the removal of the valve.

The object which I have in view is the provision of a lifting tool of inexpensive yet strong and durable construction and which will enable the work to be done efficiently, conveniently and quickly.

In general my improved tool is characterized by a pair of parallel jaw-members which are connected by twin parallel links to a central thrust shaft, forming toggle-joints, which is maintained in parallelism with the jaw-members. Rotatably connected to the rear end of the thrust shaft is a screw which works on a fixed nut member with which the jaw-members are slidably connected in such manner as to move toward and away from the thrust shaft. A suitable handle is provided for the screw, by turning which in the proper direction the jaws may be caused to approach or separate, the links straightening out towards positions rectangular to the jaw members and the thrust shaft as the jaws separate.

Means are provided whereby the tool is self-centering while in use, thus avoiding the danger of slipping or applying a torsional force to the spring.

Means are also provided whereby the thrust is relieved from the pivotal connection of the links and is transferred directly to and assumed by the main elements.

Other novel features of construction and also arrangement of parts will appear from the following description.

In the accompanying drawings wherein I illustrate the best embodiment of the principles of my invention now known to me, Fig. 1 is a side elevation showing the tool expanded and compressing a valve spring; Fig. 2, is a bottom plan view of the tool; Fig. 3 is a view similar to Fig. 1 but showing the tool retracted, parts broken away in section to better show the construction; Fig. 4 is a sectional view taken along the line IV—IV in Fig. 1; Fig. 5 is a perspective of one of the links, and Fig. 6 is an edge view of one of the links looking in the same direction as in Fig. 4.

Referring to the drawings, 1 and 2 represent a pair of jaw-members having their front ends approaching and provided with parallel jaws 3 and 4 respectively. 5 is a thrust shaft interposed between and parallel with the jaw-members, being connected to said jaw-members by pairs of twin links 6. The links 6 have their outer ends bifurcated as shown in Figs. 4, 5 and 6, the floors of the bifurcations being inclined as indicated at 7 so that when the links are retracted as shown in Fig. 3 the jaw-members will rest flat on the floors of said bifurcations. Said links are also provided with angularly disposed exterior shoulders 8 which bear on the thrust shaft when said links are retracted as shown in Fig. 3. The inner ends of said shoulders 8 are substantially rectangular to the axis of the links as shown at 9 and form an abutment which bears against the thrust shaft when the jaws are expanded as shown in Fig. 1.

The links are pivotally attached to the jaw-members by the pins or rivets 10.

The inner ends of the links are inserted in transverse slots 11 in the thrust shaft and are pivotally secured thereto by the pins or rivets 12.

The inner ends of opposing links are cut away at opposite sides as shown in Figs. 4, 5 and 6 so as to mate with each other, the extremity 13 of each of the links being rounded so as to maintain a bearing contact with the shoulder 14 of the other link. Thus the thrust in compressing the valve spring and holding it compressed will be transferred directly from one link to the other and not to the pins 12.

The rear end of the thrust shaft has rigidly attached thereto or integral therewith a rearwardly extending circular stem 15 upon which is rotatably mounted a cylindrical screw 16. A nut 17 is screwed on the threaded outer end of the stem 15, or other suitable means are provided to hold the screw on its stem.

The screw has a handle 18 attached to its outer end whereby it may be conveniently rotated by hand.

The screw 16 engages a fixed nut 19 which has opposing bifurcated arms 20 in which are slidably mounted the jaw-members 1 and 2, the latter being provided with transversely disposed pins 21 on either side of the nut-arms to prevent longitudinal motion of the jaw-members relative to the nut, so that the jaw members move only towards and from the thrust shaft while maintaining their parallelism therewith.

It is evident that when the screw is advanced through the nut the links will be straightened, thus separating the jaw, while a reverse movement of the screw will retract the links and bring the jaws together.

In Fig. 1 I show one jaw 3 slipped between the nuts 22 and 23 of the tappet 24 while the other jaw 4 is slipped beneath the washer 25 of the valve spring 26 and the spring has been compressed to clear the pin 27 whose removal will permit the withdrawal of the valve 28. The jaw 3 is shown recessed or countersunk at 29 around its engaging portion, thus enabling it to receive the tappet nut and center the tool so that the edges will expand in proper alinement, thus preventing slipping and assuring the even compression of the spring until the valve has been replaced and the pin restored.

It is apparent that the tool is of strong and simple construction and that it is free from lost motion, so the compression of the spring will be quickly and easily accomplished and the tool may be left in position to hold the spring compressed without danger of slipping or displacement.

The simple and strong construction renders it less susceptible to wear, and the possibility of wear is further reduced because of the relief of the thrust from the pivot pins and the assumption of such thrust by the links and the direct transference of the thrust through the links to the pivot shaft.

What I desire to claim is:—

1. In a valve-spring lifter, the combination of a pair of parallel jaw-members, a thrust-shaft interposed between the same, parallel link connection between said jaw-members and said thrust-shaft, a screw extending axially from the rear end of said thrust-shaft, and a nut member engaged by said screw, and connections between said nut member and the jaw members whereby said jaw members are capable of movement towards and from each other but are prevented from longitudinal movement.

2. In a valve-spring lifter, the combination of a pair of parallel jaw-members, a thrust-shaft interposed between the same, parallel link connection between said jaw-members and said thrust-shaft, a screw extending axially from the rear end of said thrust-shaft, and a nut member engaged by said screw, said nut member being provided with guide-means engaging said jaw-members whereby said jaw-members are slidable toward and away from said thrust-shaft.

3. In a valve-spring lifter, the combination of a pair of parallel jaw-members, a thrust-shaft interposed between the same, parallel link connection between said jaw-members and said thrust shaft, a screw extending axially from the rear end of said thrust-shaft, and a nut member engaged by said screw, said nut-member and jaw-members having portions in slidable engagement whereby the jaw-members are movable away from and toward the thrust-shaft but are prevented from longitudinal movement relative to said nut-member.

4. In a valve-spring lifter, the combination of a pair of parallel jaw-members, a thrust-shaft interposed between the same, parallel link connection between said jaw-members and said thrust-shaft, a screw extending axially from the rear end of said thrust-shaft, and a nut member engaged by said screw, said nut-member being provided with guide-ways engaged by said jaw-members, said guide-ways being so disposed that the jaw-members are movable toward and away from the thrust-shaft.

5. In a valve-spring lifter, the combination of a pair of parallel jaw-members, a thrust-shaft interposed between the same, parallel link connection between said jaw-members and said thrust-shaft, a screw extending axially from the rear end of said thrust-shaft, and a nut member engaged by said screw, said nut-member being provided with guide-ways engaged by said jaw-members, said guide-ways being so disposed that the jaw-members are movable toward and away from the thrust-shaft, and means for preventing longitudinal movement of said jaw-members relative to said nut member.

6. In a valve-spring lifter, the combination of a pair of parallel jaw-members, a thrust-shaft interposed between the same, parallel link connection between said jaw-members and said thrust-shaft, a screw extending axially from the rear end of said thrust-shaft, and a nut member engaged by said screw, said nut member being provided with guide-ways engaged by said jaw-members, said guide-ways being so disposed that the jaw-members are movable toward and away from the thrust-shaft, and means co-acting with said jaw-members and said nut member to prevent longitudinal movement of the former relative to the latter.

7. In a valve-spring lifter, the combination of a pair of jaw-members, a thrust-shaft positioned between said jaw-members and provided with means for moving said thrust-shaft longitudinally relative to said jaw-members, and pivotally-connected parallel links connecting each of said jaw-members to said thrust-shaft, said links being provided with portions which contact directly with the elements with which they are connected to relieve the thrust from their pivotal connection.

8. In a valve-spring lifter, the combination of a pair of jaw-members, a thrust-shaft positioned between said jaw-members and provided with means for moving said thrust-shaft longitudinally relative to said jaw-members, and pivotally-connected parallel links connecting each of said jaw-members to said thrust-shaft, said links being provided with portions adapted to bear directly on said jaw-members and said thrust-shaft whereby the thrusts are relieved from their pivotal connection.

9. In a valve-spring lifter, the combination of a pair of jaw-members, a thrust-shaft positioned between said jaw-members, means for moving said shaft longitudinally relative to said jaw-members, twin parallel links pivotally connected to said jaw-members and said thrust-shaft and forming toggle-joints, the inner ends of said links having mating bearing portions whereby the thrusts are relieved from their pivotal connection.

Signed at McKeesport, Pa., this 7th day of October, 1925.

PHILIP PALMGREEN.